June 27, 1939. M. H. ELKIN Re. 21,128
STARTER CONTROL FOR INTERNAL COMBUSTION ENGINES
Original Filed Jan. 28, 1936
Fig. 2
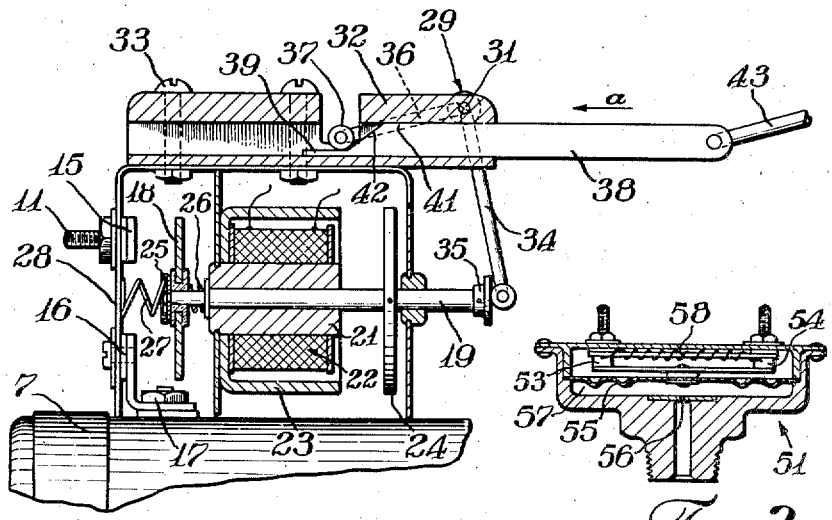
Fig. 3
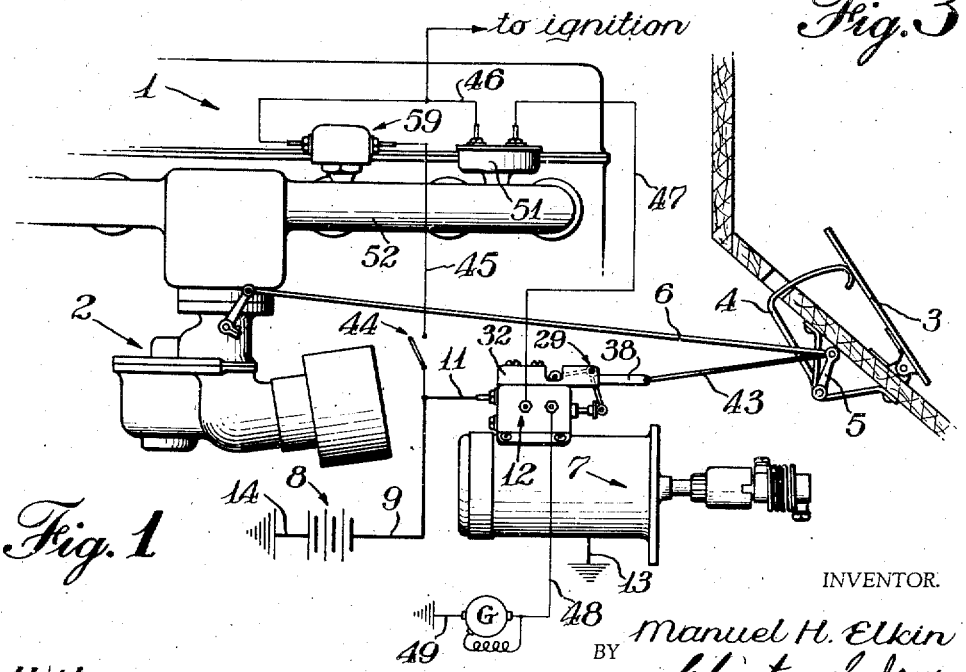
Fig. 1
INVENTOR.
Manuel H. Elkin
BY Clinton S. Jones
ATTORNEY.
Witness:
Burr W. Jones Reissued June 27, 1939

Re. 21,128

UNITED STATES PATENT OFFICE 21,128

STARTER CONTROL FOR INTERNAL COMBUSTION ENGINES

Manuel H. Elkin, Elmira Heights, N. Y., assignor, by mesne assignments, to Bendix Aviation Corporation, South Bend, Ind., a corporation of Delaware Original No. 2,067,180, dated January 12, 1937, Serial No. 61,209, January 28, 1936. Application for reissue October 15, 1938, Serial No. 235,261

16 Claims. (Cl. 290—37)

The present invention relates to a starter control for internal combustion engines and more particularly to a semi-automatic control of the type in which a control member for the power plant is utilized to effect actuation of the starting mechanism.

Semi-automatic starter controls in which the clutch pedal, the accelerator pedal, or other control member of the power plant is used to cause closure of the starting switch, have been proposed and used to some extent, but such as have been heretofore proposed have had certain disadvantages such as the interruption of the cranking operation if the control member is released, the restriction of motion of the control member to a definite position during cranking, etc. When vacuum-operated disabling means are used to prevent cranking while the engine is self-operative, there is also the possibility of undesired actuation of the starting mechanism upon sudden opening of the throttle.

It is an object of the present invention to provide a novel starter control of the above-described type in which the original function and operation of the control member is not affected in any way.

It is another object to provide such a device in which after initiation of the cranking operation, it is not interrupted by further manipulation of the control member.

It is a further object to provide such a device in which actuation of the starting mechanism while the engine is self-operative is effectively prevented.

Further objects and advantages will be apparent from the following description taken in connection with the accompanying drawing in which:

Fig. 1 is a side elevation of a preferred form of the invention as applied to a conventional power plant layout, the electrical circuits being diagrammatically indicated;

Fig. 2 is an enlarged detail of the starting switch and control mechanism partly broken away to show the internal construction; and Fig. 3 is an enlarged sectional detail of a vacuum lock-out device.

Referring first to Fig. 1 of the drawing, there is illustrated an internal combustion engine 1 having a carburetor 2, the throttle of which is controlled by accelerator pedal 3 through levers 4 and 5 and link 6.

A starting motor 7 for the engine is arranged to be energized by a battery 8 by means of leads 9 and 11 and starting switch indicated generally at 12, the starting circuit being completed through the ground connections 13 and 14.

According to the present invention, the starting switch 12 is constructed as shown in Fig. 2 and comprises a fixed contact 15 connected to lead 11, a fixed contact 16 connected to the terminal post 17 of the motor, and movable bridging contact 18 mounted on a plunger 19 which is slidable through the core 21 of an electromagnet 22. The magnet 22 is preferably of the so-called "ironclad" type and is for that purpose provided with a cylindrical magnetic casing 23 extending level with the end of the core 21. An armature in the form of a disc 24 of magnetic material is suitably fixed on the plunger 19 in such position that when the armature is in engagement with the magnet, the switch member 18 engages contacts 15, 16. Contact 18 is preferably slidably mounted on plunger 19 and yieldably held against a stop 25 thereon by means of a spring 26 which is so arranged that the final movement of the armature 24 into contact with the poles of the magnet compresses the spring 26 so as to yieldingly force the contact 18 against contacts 15, 16.

A spring 27 is provided between the stop 25 on plunger 19 and the wall of the casing 28 of the switch whereby the plunger 19 is normally positioned so that the armature 24 is out of the zone of effective influence of magnet 22. Energization of the magnet when the parts are in normal position will therefore not cause closure of the switch.

A bell crank lever 29 is pivoted at 31 on a guide member 32 suitably fixed to the casing 28 of the switch as by means of bolts 33. One arm 34 of the lever 29 is arranged to engage a head 35 on the end of plunger 19 projecting from the switch casing. The other arm 36 of the lever is arranged to bear, preferably by means of a roller 37, on a sliding cam member 38 mounted to reciprocate in the guide 32 and provided with a low portion 39 and a high portion 41 connected by an inclined portion 42.

When the parts are in normal position as shown in Fig. 2, the roller 37 bears on the low portion 39 of the cam, but when the cam member is moved in the direction of the arrow *a*, the roller 37 is raised by the inclined portion 42 onto the high portion 41 of the cam, thus causing the bell crank lever 29 to be rotated clockwise whereby the arm 34 thereof causes the plunger 19 to be moved inwardly, thus moving the armature 24 thereon into such proximity to the magnet 22 that energization thereof will attract the armature and cause closure of the switch.

Cam member 38 is arranged to be actuated by the accelerator pedal 3 by suitable means such as a link 43 (Fig. 1) connecting the cam member to the lever 8 which is actuated by the accelerator pedal as above set forth.

A control circuit for electromagnet 22 is provided comprising a manual switch 44 connected to the battery lead 9, and leads 45, 46 and 47. The control circuit is completed by a lead 48 connected to an engine-driven generator G grounded at 49 and arranged when operated by the engine to oppose the voltage of the battery and thus prevent flow of current through the electromagnet.

A vacuum lock-out device may also be used either separately or in conjunction with the generator for preventing undesired closure of the starting switch while the engine is self-operative. A preferred form of such device is illustrated in the form of a switch 51 mounted on the intake manifold 52 of the engine and having contacts 53 and 54 (Fig. 3) normally connecting the leads 46 and 47 of the control circuit. A diaphragm 55 subjected to intake vacuum holds contacts 53 and 54 open during self-operation of the engine.

A restricted passage 56 is provided in the inlet of the chamber 57 of the vacuum switch in order to delay closure of the contacts until a predetermined time after the vacuum in the intake manifold is released.

In order to prevent interruption of cranking by opening of contacts 53 and 54 during the cranking operation, a resistor 58 is shunted across the contacts, said resistor having such a value as to pass only sufficient current to energize the magnet 22 to a holding value.

A backfire circuit breaker 59 may also be mounted on the intake manifold 52 of the engine and placed in series in the control circuit as indicated in order to prevent closure of the control circuit during backward rotation of the engine by virtue of pressure built up in the intake manifold. Such a circuit breaker is illustrated and described in the patent to Christian, No. 1,986,673, and no further description thereof is accordingly deemed necessary.

In operation, and starting with the parts in their idle positions as illustrated, closure of the ignition switch 44 causes energization of the electromagnet 22 since the engine is stationary, contacts 53, 54 closed, and the generator G deenergized. The starting switch 15, 16, 18 is not closed, however, since the armature 24 is out of the zone of influence of the electromagnet 22.

Depression of the accelerator pedal 3 by the operator thereupon causes the bell crank lever 29 to be rotated clockwise by the action of the sliding cam member 38, the arrangement being such that when the throttle valve of carburetor 2 has been opened by the accelerator to a position suitable for starting the engine, the bell crank lever 29 has pushed the plunger 19 inwardly sufficient to bring the armature 24 within the zone of influence of electromagnet 22. The electromagnet thereupon attracts the armature 24, moving the plunger 19 to complete the closure of the starting switch, whereupon the circuit from battery 8 through the starting motor 7 is completed and cranking of the engine takes place in the usual manner.

It will be noted that the cam member 38 does not in any way interfere with the motion of the accelerator pedal 3 so that the throttle may be opened further or closed or placed in any desired position. Moreover, although contacts 53, 54 may be opened by the intake vacuum during cranking, the electromagnet 22 remains energized sufficiently to hold the starting switch 12 closed by virtue of current traversing the resistor 58. Cranking is therefore not interrupted but continues until the engine starts.

When the engine becomes self-operative, rotation of the generator G thereby causes sufficient electromotive force to be built up by the generator to oppose the voltage of the battery and cause deenergization of the electromagnet 22. The starting switch is thereupon permitted to open and remains opened thereafter as long as the engine is self-operative.

It will be understood that other embodiments of the invention are possible, that various changes might be made in the design of the parts and that other control elements might be utilized to operate the starting mechanism such, for instance, as the clutch pedal or brake pedal of an automotive vehicle.

What is claimed is:

1. In combination with an internal combustion engine and a starting system therefor including a magnetic starting switch, a manually operable control member, and means operable thereby for moving the switch toward closed position but inoperative to close the switch.

2. In combination with an internal combustion engine and a starting system therefor including a magnetic starting switch, a manually operable control member, means operable thereby for moving the switch toward closed position but inoperative to close the switch, manually controlled means for energizing said switch sufficiently to complete the closure thereof, and an engine-driven generator arranged to oppose energization of the switch.

3. In combination with an internal combustion engine, a starting system therefor including a magnetic starting switch comprising an electromagnet and an armature movable thereby to close the switch, means normally maintaining said armature out of the zone of effective influence of the electromagnet, a manually operable control member, and means actuated thereby for moving the armature into the zone of influence of the magnet.

4. In combination with an internal combustion engine, a starting system therefor including a magnetic starting switch comprising an electromagnet and an armature movable thereby to close the switch, means normally maintaining said armature out of the zone of effective influence of the electro-magnet, a manually operable control member for the engine, means actuated thereby for moving the armature into the zone of influence of the magnet but inoperative to cause closure thereof, and means preventing energization of the magnet during self-operation of the engine.

5. In combination with an internal combustion engine, a starting system therefor including a magnetic starting switch having an electromagnet and an armature movable thereby to close the switch, a manually operable engine power control member, and means operable thereby to move said armature to partially close the switch but inoperative to effect closure thereof, said means being so constructed that the control member is at all times free for normal operation.

6. In combination with an internal combustion engine and a starting system therefor including a starting switch, a manually operable engine power control member, means actuated by said control member for moving said switch toward closed position but inoperative to effect closure thereof, and means then operative for closing said switch and maintaining said switch closed irrespective of movement of the control member.

7. In combination with an internal combustion engine and a starting system therefor including a starting switch, a manually operable engine power control member, means actuated by said control member for partially closing said switch but incapable of effecting closure thereof, and manually controlled means for moving the switch from its partially closed to its fully closed position.

8. In combination with an internal combustion engine, a starting system therefor including a starting switch, a manually operable engine power control member, means actuated by said control member for partially closing said switch but incapable of effecting closure thereof, manually controlled means independent of the control member for moving the switch from its partially closed to its fully closed position, and means responsive to self-operation of the engine for rendering said manually controlled means inoperative.

9. In combination with an internal combustion engine, a starting system therefor including a starting switch, means normally maintaining said switch open, manually operable means for controlling the fuel supply to the engine, means actuated by operation thereof to partially close the starting switch, and manually controlled means for completing the closure of the starting switch and maintaining the same closed irrespective of movement of the means for controlling the fuel supply.

10. In combination with an internal combustion engine, a starting system therefor including a magnetic starting switch having an electromagnet and an armature movable thereby to close the switch, means normally maintaining said switch open and the armature out of the zone of influence of the electro-magnet, manually operable means for controlling the fuel supply to the engine, means actuated by operation thereof to partially close the starting switch and move said armature into the zone of effectiveness of the electromagnet, and manually controlled means for energizing said electromagnet to complete the closure of the starting switch and hold it closed irrespective of subsequent movement of the fuel-controlling means.

11. In combination with an internal combustion engine, a starting system therefor including a magnetic starting switch having an electromagnet and an armature movable thereby to close the switch, means normally maintaining said switch open and the armature out of the zone of influence of the electromagnet, manually operable means for controlling the fuel supply to the engine, means actuated by an initial operation thereof to partially close the starting switch and move said armature into the zone of effectiveness of the electromagnet, manually controlled means for energizing said electromagnet, and an engine-driven generator arranged to oppose energization of said electromagnet.

12. In combination with an internal combustion engine having an intake manifold, a starting system therefor including a magnetic starting switch, a manual control member for the engine, means actuated thereby for partially closing said switch, means energizing said switch to complete the closure thereof, and means responsive to variations of pressure in said intake manifold for preventing such closure of said switch.

13. In combination with an internal combustion engine having an intake manifold, a starting system therefor including a magnetic starting switch, a manual control member for the engine, means actuated thereby for partially closing said switch, means energizing said switch to complete the closure thereof, means responsive to variations of pressure in said intake manifold for preventing such closure of said switch, and means for holding said switch closed irrespective of the operation of the pressure-responsive means.

14. In combination with an internal combustion engine having an intake manifold, a starting system therefor including a magnetic starting switch, a manual control member for the engine, means actuated thereby for partially closing said switch, means energizing said switch to complete the closure thereof, means responsive to variations of pressure in said intake manifold for preventing such closure of said switch, means for holding said switch closed irrespective of the operation of the pressure-responsive means, and means responsive to self-operation of the engine for deenergizing said holding means.

15. A controlling device for the switches of electric starters of internal combustion engines including a starter switch, electromagnetic operating means, a switch operating element, a control element for an engine part other than the starter, means connected thereto to bring said operating element into range of the electromagnetic operating means, said electromagnetic operating means including a holding coil operable to disconnect said control element from said switch operating element.

16. A controlling device for the switches of electric starters of internal combustion engines including a starter switch, electromagnetic operating means, a switch operating element, a control element for an engine part other than the starter, means connected thereto to bring said operating element into range of the electromagnetic operating means, said electromagnet means including a holding coil operable to disconnect said control element from said switch operative element, and means to control the operation of said electromagnetic means according to the voltage of a lighting dynamo driven from the engine and independently of the position of the control member.

MANUEL H. ELKIN.